UNITED STATES PATENT OFFICE.

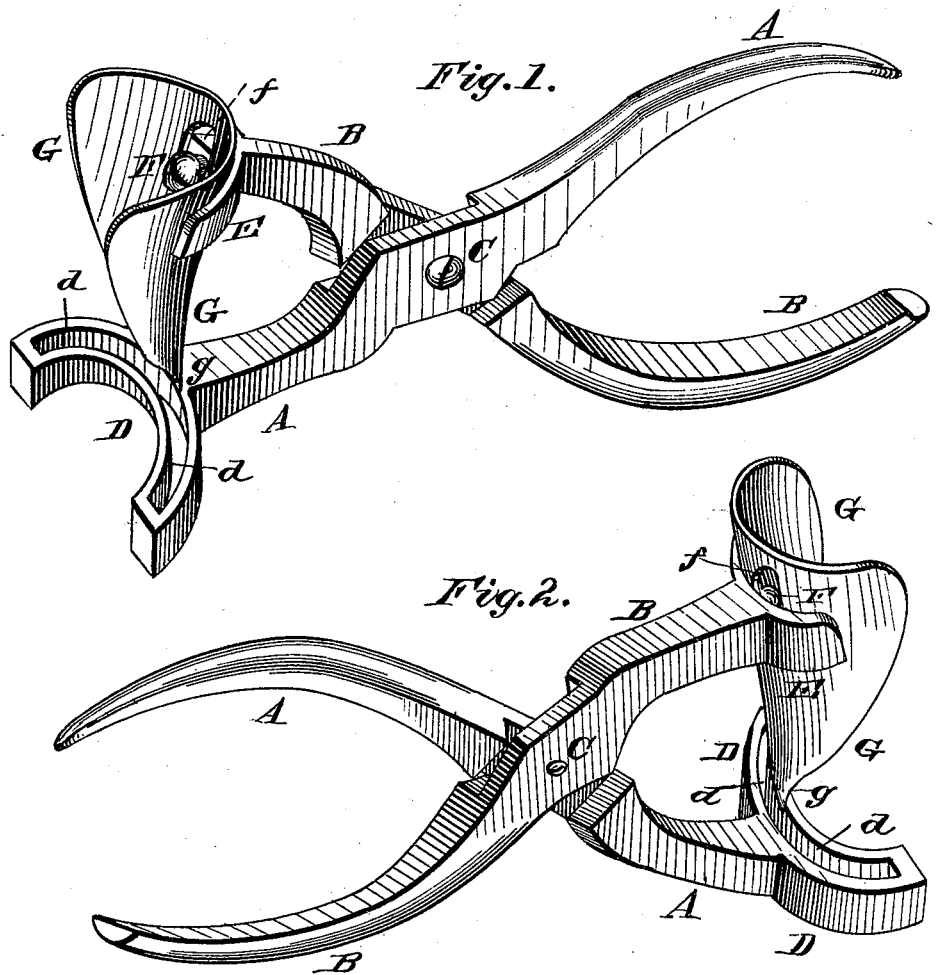

SEWARD LANE AND FRANK LANE, OF FLETCHER, OHIO.

HOG-NOSE TRIMMER.

SPECIFICATION forming part of Letters Patent No. 251,604, dated December 27, 1881.

Application filed September 15, 1881. (No model.)

*To all whom it may concern:*

Be it known that we, SEWARD LANE and FRANK LANE, of Fletcher, in the county of Miami and State of Ohio, have invented certain new and useful Improvements in Hog-Nose Trimmers; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective front view, and Fig. 2 is a similar rear view.

Like letters of reference indicate corresponding parts in both the figures.

Our invention has relation to forceps or nippers adapted to cut away the protuberant cartilage from a hog's nose or snout, to discourage him from rooting; and it consists in the improved trimmer or "hog-snouter" hereinafter described and claimed.

In the annexed drawings, A and B are the handles of our improved snouter or trimmer, which are pivoted at C. The outer end of the handle A has a curved and slotted part, D, shaped or concaved to fit the hog's snout, while the other arm, B, terminates in a solid curved cross-piece, E, into the recessed and screw-threaded middle part of which is inserted a headed screw, F.

G is the cutter or trimming-knife, which is of the shape clearly shown in the drawings, curved to fit the curvature of the slot $d$ in the part D, and terminating in a sharp point, $g$, at its lower end. The upper broad part of the cutter has a slot, $f$, through which the headed screw F is inserted; and it follows that by loosening said screw the cutter may be adjusted up or down upon the curved part or cross-piece E, according to what depth of cut it is desired to make. The lower curved and slotted part, D, serves in the threefold capacity of a guard or shield, by which the depth of the cut is gaged, of a guide for the sharpened cutter or trimming-knife G, and as a means for steadying the instrument and hand during the operation of trimming. The inside or concavity of said guide D being placed against the hog's snout at the place where it is desired to trim it, (the cutter having first been raised by separating the handles A and B,) the trimming is easily effected, and in a moment of time, by simply bringing the handles together, the cut conforming to the shape of the animal's nose, and thus avoiding both pain and injury, as only the hardened part or cartilage is removed.

It will be seen that the knife or cutter G not only tapers gradually to form the point $g$, but also that it is curved backwardly from point to top, so as to allow it to work easily in the curved and slotted guide D and make a perfectly straight or even incision, irrespective of its adjustment upon the handle B.

Having thus described our invention, we claim and desire to secure by Letters Patent of the United States—

The hog-snout trimmer herein shown and described, composed of the handle A, having concave guard or cross-head D, slotted at $d$, and handle B, provided with the cross-head E and adjustable curved cutter G, the handles A and B being pivoted at C, so that the curved cutter will move through the slotted concave guard in the arc of a circle having pivot C for its center, as shown and specified.

In testimony that we claim the foregoing as our own we have hereunto affixed our signatures in presence of two witnesses.

SEWARD LANE.
FRANK LANE.

Witnesses:
MARTIN SMITH,
AUGUSTUS POWELL.